United States Patent
O'Hare et al.

(10) Patent No.: US 12,458,072 B2
(45) Date of Patent: Nov. 4, 2025

(54) HEATER CONTROL IN AEROSOL GENERATING DEVICE

(71) Applicant: JT International SA, Geneva (CH)

(72) Inventors: Aidan O'Hare, Coventry (GB); Stephen Rooney, Wrexham (GB)

(73) Assignee: JT International SA (CH)

( * ) Notice: Subject to any disclaimer, the term of this patent is extended or adjusted under 35 U.S.C. 154(b) by 840 days.

(21) Appl. No.: 17/778,157

(22) PCT Filed: Nov. 19, 2020

(86) PCT No.: PCT/EP2020/082689
§ 371 (c)(1),
(2) Date: May 19, 2022

(87) PCT Pub. No.: WO2021/099467
PCT Pub. Date: May 27, 2021

(65) Prior Publication Data
US 2023/0042987 A1    Feb. 9, 2023

(30) Foreign Application Priority Data
Nov. 20, 2019  (EP) .................................. 19210446

(51) Int. Cl.
*A24F 40/57* (2020.01)
*A24F 40/10* (2020.01)
(Continued)

(52) U.S. Cl.
CPC .............. *A24F 40/57* (2020.01); *A24F 40/10* (2020.01); *A24F 40/50* (2020.01); *G05B 11/28* (2013.01)

(58) Field of Classification Search
CPC .......... A24F 40/50; A24F 40/40; A24F 40/10; A24F 40/00; A24F 40/57; A24F 40/53;
(Continued)

(56) References Cited

U.S. PATENT DOCUMENTS

| 9,829,389 B2 | 11/2017 | Coursey et al. | |
| 2006/0047368 A1* | 3/2006 | Maharajh | F22B 37/38 |
| | | | 128/200.14 |

(Continued)

FOREIGN PATENT DOCUMENTS

EP    2856893 A1    4/2015

OTHER PUBLICATIONS

International Search Report for Application No. PCT/EP2020/082689 mailed Dec. 10, 2020, pp. 1-4.

*Primary Examiner* — Alex B Efta
(74) *Attorney, Agent, or Firm* — Lerner David LLP

(57) ABSTRACT

A control device of an aerosol generating device includes a main control unit, and is connectable to a battery and a heater coil. The main control unit is configured to carry out one or more execution loops, a first execution loop includes applying a first power output to the heater coil for a first number of steps, disabling the first power output and thereby switching off the heater coil in a second number of steps, measuring a first heater coil voltage of the heater coil in a third number of steps, pausing with the heater coil switched off for a fourth number of steps, and measuring a first off-load battery voltage of the battery in a fifth number of steps. The main control unit is further configured to calculate an updated power output based upon the first heater coil voltage and first off-load battery voltage.

16 Claims, 6 Drawing Sheets

(51) Int. Cl.
*A24F 40/50* (2020.01)
*G05B 11/28* (2006.01)

(58) Field of Classification Search
CPC .......... A24F 40/65; A24F 40/46; A24F 40/06; A24F 40/30; G05B 11/28
See application file for complete search history.

(56) References Cited

U.S. PATENT DOCUMENTS

| | | | |
|---|---|---|---|
| 2013/0340750 A1* | 12/2013 | Thorens | A24F 40/50 128/202.21 |
| 2014/0299141 A1* | 10/2014 | Flick | H05B 1/0202 219/494 |
| 2014/0334804 A1* | 11/2014 | Choi | A24F 40/485 392/404 |
| 2016/0374397 A1 | 12/2016 | Jordan et al. | |
| 2019/0069599 A1 | 3/2019 | Monsees et al. | |
| 2019/0239566 A1 | 8/2019 | Alarcon et al. | |

* cited by examiner

HEATER CONTROL IN AEROSOL GENERATING DEVICE

CROSS-REFERENCE TO RELATED APPLICATIONS

The present application is a national phase entry under 35 U.S.C. § 371 of International Application No. PCT/EP2020/082689, filed Nov. 19, 2020, published in English, which claims priority to European Application No. 19210446.1 filed Nov. 20, 2019, the disclosures of which are incorporated herein by reference.

FIELD OF INVENTION

The present invention relates to aerosol generating devices, and more specifically heater control systems for aerosol generating devices.

BACKGROUND

Aerosol generating devices such as electronic cigarettes and other aerosol inhalers or vaporisation devices are becoming increasingly popular consumer products.

Heating devices for vaporisation or aerosolisation are known in the art. Such devices typically include a heater arranged to heat a vaporisable product. In operation, the vaporisable product is heated with the heater to vaporise the constituents of the product for the consumer to inhale. In some examples, the product may comprise tobacco and may be similar to a traditional cigarette, in other examples the product may be a liquid, or liquid contents in a capsule.

There is a need for more precise heater control in such devices. An object of the invention is, therefore, to address such a challenge.

SUMMARY

According to an aspect the present invention provides a control device of an aerosol generating device, the control device comprising a main control unit, and connectable to a battery and a heater coil, the main control unit configured to carry out one or more execution loops, a first execution loop of the one or more execution loops comprising the following steps: apply a first power output to the heater coil for a first number of steps of the first execution loop; disable the first power output and thereby switch off the heater coil in a second number of steps of the first execution loop; measure a first heater coil voltage of the heater coil in a third number of steps of the first execution loop; pause with the heater coil switched off for a fourth number of steps of the first execution loop; and measure a first off-load battery voltage of the battery in a fifth number of steps of the first execution loop; wherein the main control unit is further configured to calculate an updated power output based upon the first heater coil voltage and first off-load battery voltage.

In this way, the pause between measuring the heater coil voltage and the off-load battery voltage measurement allows for the off-load battery voltage to be measured separately from the heater coil voltage so that the heater coil voltage is measured immediately after heating whilst allowing the battery time to recover, without the heating load applied (i.e. in an "off-load" state), before measuring the off-load battery voltage. This allows for both the heater coil voltage and off-load battery voltage to be measured as accurately as possible. Preferably each step corresponds to a predetermined amount of time, or step frequency (i.e. the number of steps occurring per second).

Preferably, the main control unit is further configured to apply the updated power output to the heater coil in a subsequent execution loop that is subsequent to the first execution loop.

In this way, the calculation of the updated power output can be carried out separately to the first execution loop; as such the calculations required to determine the subsequent power output, for the subsequent execution loop, can be separated from the first execution loop such that the processing required for the calculations does not interfere with the critical steps of the first execution loop. If the updated power output were to be applied in an execution loop immediately after the first execution loop, delays may occur due to the main control unit processing the calculation of the updated power output; the separation prevents this from occurring.

Preferably, disabling the first power output and thereby switching off the heater coil in a second number of steps occurs following the first number of steps of the first execution loop.

Preferably, measuring a first heater coil voltage of the heater coil in a third number of steps occurs following the second number of steps of the first execution loop with a smaller power output than the first power output applied to the heater coil.

Preferably, pausing with the heater coil switched off for a fourth number of steps occurs following the third number of steps of the first execution loop.

Preferably, measuring a first off-load battery voltage of the battery in a fifth number of steps occurs following the fourth number of steps of the first execution loop, wherein an off-load battery voltage corresponds to the battery being in an off-load state in which a heating load is not being applied.

Preferably, each step in the first number of steps, the second number of steps, the third number of steps, the fourth number of steps, and the fifth number of steps corresponds to a predetermined time period.

Preferably, the main control unit is further configured to calculate the updated power output based upon the first heater coil voltage and the first off-load battery voltage in a calculation loop separate to the one or more execution loops.

In this way, the calculations required to determine the updated power output can be separated from the one or more execution loops such that the processing required for the calculations does not interfere with the critical steps of the one or more execution loops.

Preferably, the main control unit is configured to carry out the calculation loop and the one or more execution loops using separate processing functionalities.

Carrying out the calculation loop may take longer than an execution loop. As such, carrying out the calculations in the calculation loop using separate processing functionality prevents the calculation loop interfering with the execution loop. In this way, the aerosol generating device can continue to function whilst the calculations are carried out.

Preferably, the main control unit is further configured to carry out a second execution loop, wherein the first execution loop is offset from the subsequent execution loop by at least the second execution loop and wherein the second execution loop comprises: applying the first power output to the heater coil for a first number of steps of the second execution loop; and wherein the main control unit carries out the calculation loop at least partially in parallel to the second execution loop.

In this way, the second execution loop allows for the aerosol generating device to continue to operate whilst the updated power output is calculated for the subsequent execution loop, i.e. the calculations of the updated power output can be carried out while the second execution loop is executing rather than processing the calculations as part of the first execution loop which could result in processing delays in the steps of the first execution loop or in the initiation of the second execution loop.

By applying the second power output during the second execution loop, the aerosol generating device may continue to apply a power output to the heater coil while the updated power output is calculated for the subsequent execution loop.

Preferably, the main control unit is further configured to carry out a third execution loop between the first execution loop and the subsequent execution loop, wherein the third execution loop comprises: applying the first power output to the heater coil for a first number of steps of the third execution loop; and updating the first power output to the updated power output in response to determining that the updated power output is available from the calculation loop.

In this way, the control device continues to apply a power output to the heater coil until the updated power output is calculated; the power output is then promptly updated.

Preferably, the first power output may be updated to the updated power output at the end of the third execution loop. For example, the first power output may be updated to the updated power output in a fifth number of steps of the third execution loop. The start of each execution loop can be hardware-triggered, in such a case there is no time to update the power output at the start of an execution loop. For example, updating the first power output at the start of the subsequent loop could result in delays to applying the heater output. As such, it is advantageous to update the power output at the end of an execution loop for use in the following execution loop. In this way, delays to applying the updated power output are avoided.

Preferably, the third execution loop may be carried out between the second execution loop and the subsequent execution loop. Further execution loops may be carried out between the first execution loop and the third execution loop, using the first power output, until the calculation loop makes the updated power output available.

Preferably, each power output is a pulse width modulated output with an associated duty cycle.

In this way pulse width modulation can be utilised to effectively control the power supplied to the heater. Preferably, updating the power output may comprise updating the associated duty cycle.

Preferably, the main control unit is configured to calculate a temperature of the heater coil based upon a resistance of the heater coil, and further configured to calculate the updated power output based on a difference between the calculated heater coil temperature and a target heater coil temperature.

In this way, the actual temperature of the heater coil, i.e. the temperature of the heater coil during heating, can be accurately determined. Moreover, the updated power output or duty cycle can be calculated based upon this to provide a level of power to the heater coil to achieve the target heater coil temperature. Preferably the temperature of the heater coil may be calculated in the calculation loop. Preferably the updated power output may be based on a difference between the calculated heater coil temperature and a target heater coil temperature as calculated in the calculation loop.

Preferably, the control device further comprises a heater coil measurement sub-circuit, the heater coil measurement sub-circuit comprising a battery terminal connected to the heater coil and a test resistor arranged therebetween.

In this way, the voltage of the heater coil can be accurately measured.

Preferably, the heater coil measurement sub-circuit is arranged to apply the smaller power than the first power output to the heater coil to measure the first heater coil voltage.

In this way, a controlled potential can be applied to the coil when the heating of the heater coil is switched off; this allows for the heater coil voltage to be accurately measured whilst the battery recovers. Preferably, the heater coil measurement sub-circuit may further comprise a second transistor, and wherein the second transistor is arranged to switch the relatively smaller current. In this way, the current used for measuring the heater coil voltage can be carefully controlled. Preferably, the power applied by the heater coil measurement sub-circuit may be extremely small compared to the first power output. Preferably the second transistor may be a MOSFET.

Preferably, the main control unit is configured to calculate the resistance of the heater coil based on the first heater coil voltage, a resistance of the test resistor, and the first off-load battery voltage.

Preferably, the main control unit is configured to calculate the resistance, $R_{COIL}$, of the heater coil based on the first heater coil voltage, $V_{COIL}$, a resistance, $R_{TEST}$, of the test resistor and the first off-load battery voltage, $V_{OFFLOAD}$, as:

$$R_{COIL} = \frac{(V_{COIL})(R_{TEST})}{V_{OFFLOAD} - V_{COIL}} - R_{SERIES}$$

$R_{SERIES}$ is the known resistance of the electrical contacts which are in series with the heater coil but which contribute to the measured voltage $V_{COIL}$. $R_{SERIES}$ is not expected to vary significantly with temperature, is measured at manufacture and stored in the capsule electronic circuit.

In this way, the heater coil voltage can be used with the resistance of the test resistor and the measured off-load battery voltage to determine the resistance of the heater coil. Preferably the resistance of the test resistor may be a known value stored at the main control unit. Preferably, the resistance of the heater coil may be calculated in the calculation loop.

Preferably, the main control unit is further configured to, in the second number of steps, set the heater coil to a high voltage and measure a first on-load battery voltage before switching off the heater coil.

The on-load battery voltage corresponds to the voltage when a heating load is applied, i.e. when the battery is in an "on-load" state. The measured battery voltage when the heating load is applied can be used in the accurate determination of the updated power output. Preferably the heater coil may be set to the high voltage only for a short time, on the order of microseconds; this may have a negligible heating effect whilst ensuring the battery is on load at the time of measuring.

Preferably, the control device further comprises a first transistor, wherein a pulse width modulation input switches the first transistor to apply a pulse width modulation output to the heater coil.

In this way, a low current output of the main control unit can switch the higher current associated with the heater in a pulse width modulated manner. Preferably the first transistor may be a MOSFET. More preferably, the pulsed width modulation input may be connected between the main control unit and the gate of the MOSFET, the battery is connected to the source of the MOSFET, and the heater coil is connected to the drain of the MOSFET.

According to another aspect the present invention provides an aerosol generating device comprising the control device of the preceding aspect. According to another aspect the present invention provides a method of operating a control device of an aerosol generating device, the method comprising in a first execution loop carrying out the following steps: applying a first power output to a heater coil for a first number of steps of the first execution loop; disabling the first power output and thereby switching off the heater coil in a second number of steps of the first execution loop; measuring a first heater coil voltage of the heater coil in a third number of steps of the first execution loop; pausing with the heater coil switched off for a fourth number of steps of the first execution loop; and measuring a first off-load battery voltage of a battery in a fifth number of steps of the first execution loop; the method further comprising calculating an updated power output based upon the first heater coil voltage and first off-load battery voltage.

In this way, the pause between measuring the heater coil voltage and the off-load battery voltage measurement allows for the off-load battery voltage to be measured separately from the heater coil voltage so that the heater coil voltage is measured immediately after heating whilst allowing the battery time to recover, without the heating load applied (i.e. in an "off-load" state), before measuring the off-load battery voltage. This allows for both the heater coil voltage and off-load battery voltage to be measured as accurately as possible. Preferably each step may correspond to a predetermined amount of time, or step frequency (i.e. the number of steps occurring per second).

Preferably, disabling the first power output and thereby switching off the heater coil in a second number of steps occurs following the first number of steps of the first execution loop.

Preferably, measuring a first heater coil voltage of the heater coil in a third number of steps occurs following the second number of steps of the first execution loop with a smaller power output than the first power output applied to the heater coil.

Preferably, pausing with the heater coil switched off for a fourth number of steps occurs following the third number of steps of the first execution loop.

Preferably, measuring a first off-load battery voltage of the battery in a fifth number of steps occurs following the fourth number of steps of the first execution loop, wherein an off-load battery voltage corresponds to the battery being in an off-load state in which a heating load is not being applied.

Preferably, each step in the first number of steps, the second number of steps, the third number of steps, the fourth number of steps, and the fifth number of steps corresponds to a predetermined time period.

According to another aspect the present invention provides a non-transitory computer-readable medium storing instructions that, when executed by one or more processors, cause the one or more processors to carry out: in a first execution loop: applying a first power output to a heater coil for a first number of steps of the first execution loop; disabling the first power output and thereby switching off the heater coil in a second number of steps, following the first number of steps, of the first execution loop; measuring a first heater coil voltage of the heater coil in a third number of steps, following the second number of steps, of the first execution loop with a smaller power output than the first power output applied to the heater coil; pausing with the heater coil switched off for a fourth number of steps, following the third number of steps, of the first execution loop; and measuring a first off-load battery voltage of a battery in a fifth number of steps, following the fourth number of steps, of the first execution loop, wherein an off-load battery voltage corresponds to the battery being in an off-load state in which a heating load is not being applied; wherein each step in the first number of steps, the second number of steps, the third number of steps, the fourth number of steps, and the fifth number of steps corresponds to a predetermined time period; and further comprising calculating an updated power output based upon the first heater coil voltage and first off-load battery voltage.

Preferably, each step corresponds to an integer number of PWM cycles, with each PWM cycle having an on period and an off period forming the PWM cycle. Preferably, each step corresponds to one PWM cycle.

BRIEF DESCRIPTION OF THE DRAWINGS

Embodiments of the invention are now described, by way of example, with reference to the drawings, in which.

DETAILED DESCRIPTION

Figure 1:
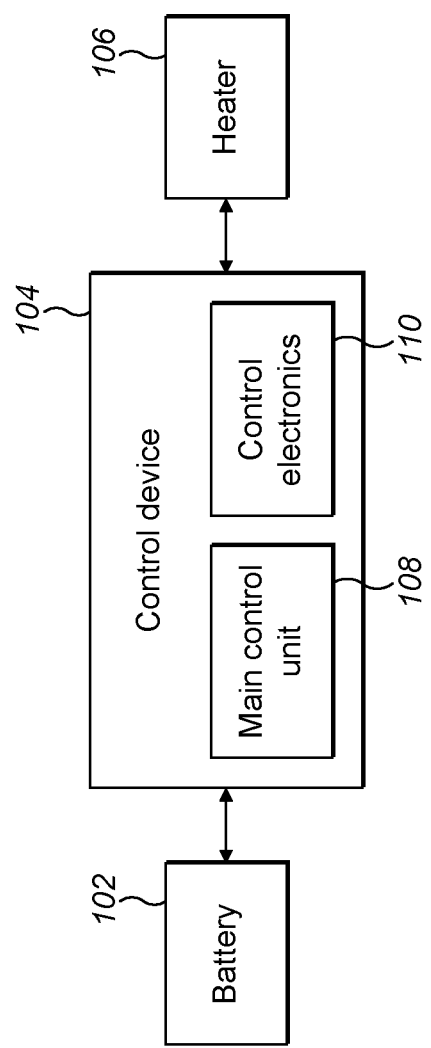
FIG. 1 is a block diagram of an aerosol generating device according to an embodiment of the invention.

FIG. 1 shows a block diagram of the components of an aerosol generating device, or electronic cigarette. The aerosol generating device comprises a heater (also referred to as a heater coil) 106, a control device 104, and a battery 102. The battery 102 provides power to the heater 106 and the control device 104. The control device 104 comprises a main control unit 108 and control electronics 110 arranged to control the heater 106, and to control the application of power to the heater 106 from the battery 102. In an example, the main control unit 108 is a microcontroller unit. In an example, the aerosol generating device is arranged to receive a capsule comprising vapour generating material; in such an example, the heater 106 can be arranged inside the capsule as a component of the capsule and is connected to the aerosol generating device by an electrical connection. The capsule can also include capsule electronics in which capsule information is stored that can be read by the microcontroller unit 108 of the aerosol generating device.

The heater 106 is arranged to aerosolise or vaporise a vapour generating material. The vapour generating material can be a solid, such as tobacco, a liquid, such as a vaporisable liquid, or any other suitable type of vaporisable material. For the purposes of the present description, it will be understood that the terms vapour and aerosol are interchangeable.

Figure 2:
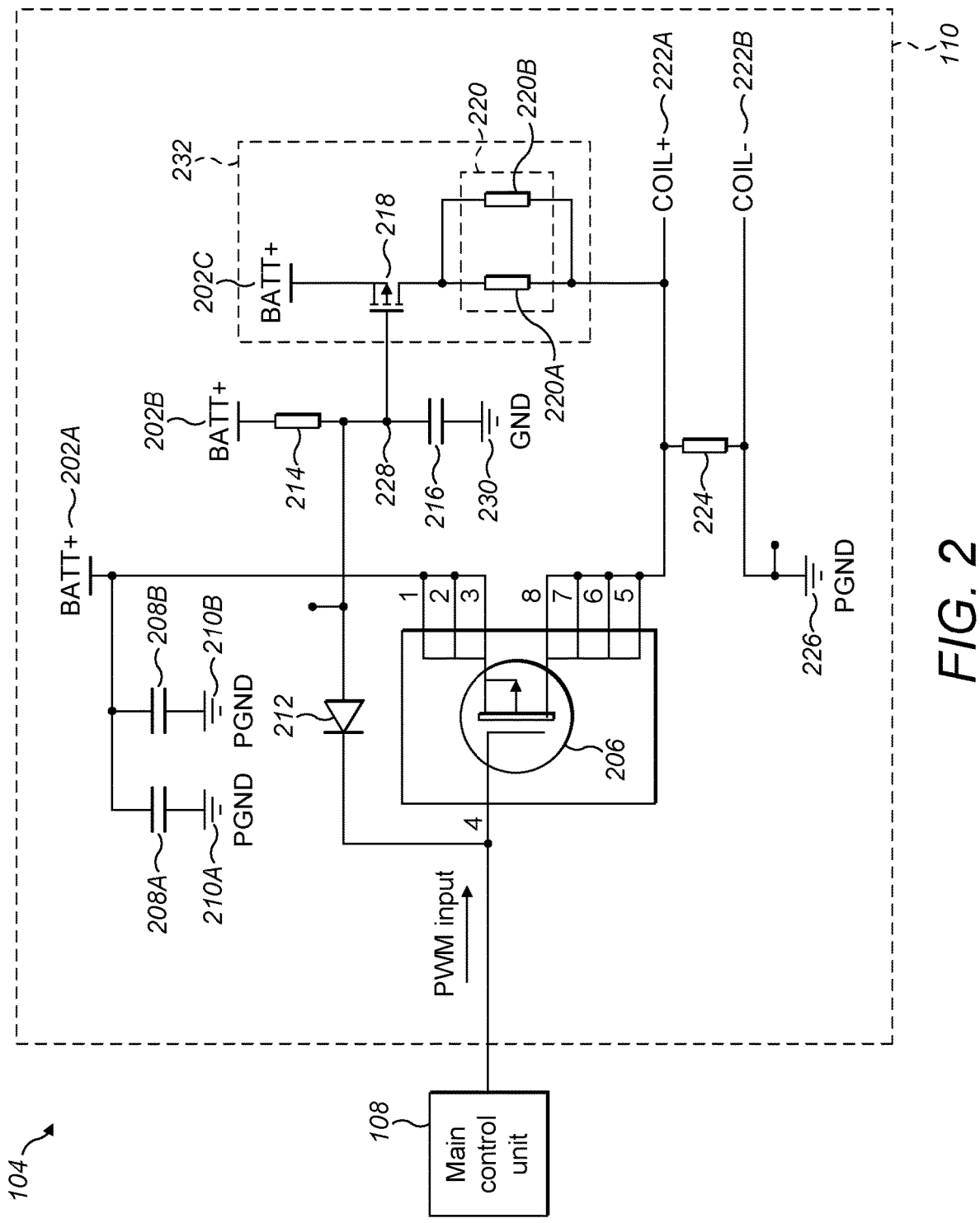
FIG. 2 is a circuit diagram of an aerosol generating device control device according to an embodiment of the invention.

FIG. 2 shows a circuit diagram illustrating a control device 104 for a vapour generating device. The control device 104 comprises the main control unit 108 and the control electronics 110.

The control electronics comprise a first transistor, or main MOSFET 206, in connection with the main control unit 108. The main control unit 108 is connected to the gate of main MOSFET 206. The source of the main MOSFET 206 is connected to a first battery terminal 202A. The drain of the main MOSFET 206 is connected to the positive terminal 222A of the heater 106. The negative terminal 222B of the heater 106 is connected to a ground point 226.

The main control unit 108 provides a pulse width modulated (PWM) signal to the gate of the main MOSFET 206. This signal switches a higher current from the first battery terminal 202A in a PWM manner using the main MOSFET 206. This provides a PWM signal, using the current from the first battery terminal 202A, to the positive terminal 222A of the heater. In this way, the main control unit 108 uses the main MOSFET 206 to provide a PWM power output to the heater 106.

An optional first resistor 224 is connected between the positive heater terminal 222A and the negative heater terminal 222B for testing purposes when a capsule is not connected; this resistor is not essential to the operation of the device.

The first battery terminal 202A is also connected to a first capacitor 208A and a second capacitor 208B in parallel. The first capacitor 208A and the second capacitor 208B are connected to ground points 210A and 210B respectively. In an example, capacitor 208A has a capacitance of 10 μF and capacitor 208B has a capacitance of 100 nF. The first capacitor 208A and the second capacitor 208B are decoupling capacitors which reduce high frequency fluctuations in the voltage across the power plane.

A second battery terminal 202B is connected to a second resistor 214. The second resistor 214 is connected to the gate of the main MOSFET 206 and to the gate of a second transistor, or second MOSFET 218. In an example, the second resistor 214 has a resistance of 100 kΩ. The second resistor 214 is connected to the gate of the main MOSFET 206 by way of a diode 212. The diode 212 prevents logic high signals from the PWM signal from the main control unit 108 from reaching the second MOSFET 218. The second resistor 214 weakly connects the battery terminal to the gate of the second MOSFET 218 such that during power-up, or when the microprocessor unit 108 is powered off, the second MOSFET 218 is switched off. During vaping operation the PWM input from the microprocessor unit 108 overrides the voltage from the second resistor 214. The main MOSFET 206 and the second MOSFET 218 can be p-channel devices, with a logic high output when a logic low input voltage is applied to the gate.

The second resistor 214 is connected to the gate of the second MOSFET 218 by way of node 228. A third capacitor 216 is connected between node 228 and ground point 230. In an example, the third capacitor has a capacitor of 100 nF. In a steady state, when the device is not vaping, the PWM input from the microprocessor unit 108 to main MOSFET 206 is high, which turns the main MOSFET 206 off. The third capacitor 216 charges up via the second resistor 214 causing the gate voltage of the second MOSFET 218 to be high, and so the second MOSFET 218 is switched off. There is, therefore, no current flow through the resistors 220A and 220B. When the microprocessor unit 108 drives the gate signal of the main MOSFET 206 low during PWM, the third capacitor 216 discharges, thus turning on the second MOSFET 218. When the PWM signal from the microprocessor unit 108 to the main MOSFET 206 is held during the measurement phase, as described subsequently, the time constant of the third capacitor 216 and the second resistor 214 is such that the second MOSFET 218 remains on for the duration of the measurement phase, enabling the resistance between the heater coil terminals 222A and 222B to be measured. Once vaping operation has finished and the signal from the microprocessor unit 108 to the main MOSFET 206 returns to being a steady state high signal, the third capacitor 216 charges up, switching off the second MOSFET 218.

The source of the second MOSFET 218 is connected to a third battery terminal 202C. The drain of the second MOSFET 218 is connected to the positive heater terminal 222A by way of a test resistor 220. In the example presented in FIG. 2, the test resistor 220 comprises two resistors 220A and 220B in parallel. In an example, each of these resistors are 68Ω resistors, thereby providing a total resistance of 34Ω. Typically, 68Ω resistors are more readily available (with the necessary power rating, case size and tolerance) than 34Ω resistors. In an alternative, the test resistor 220 may comprise only one resistor, for example a 34Ω resistor. In an example, the value of the test resistance is stored in storage associated with and accessible by the control device. The skilled person will readily understand that other numbers and combinations of resistors, with different resistor values, may also be used as appropriate.

The third battery terminal 202C, second MOSFET 218, and test resistor 220 form a sub-circuit 232 arranged to measure the voltage of the heater coil.

The second battery terminal 202B provides a switching current to the gate of the second MOSFET 218 to switch on the sub-circuit 232.

Figure 3:
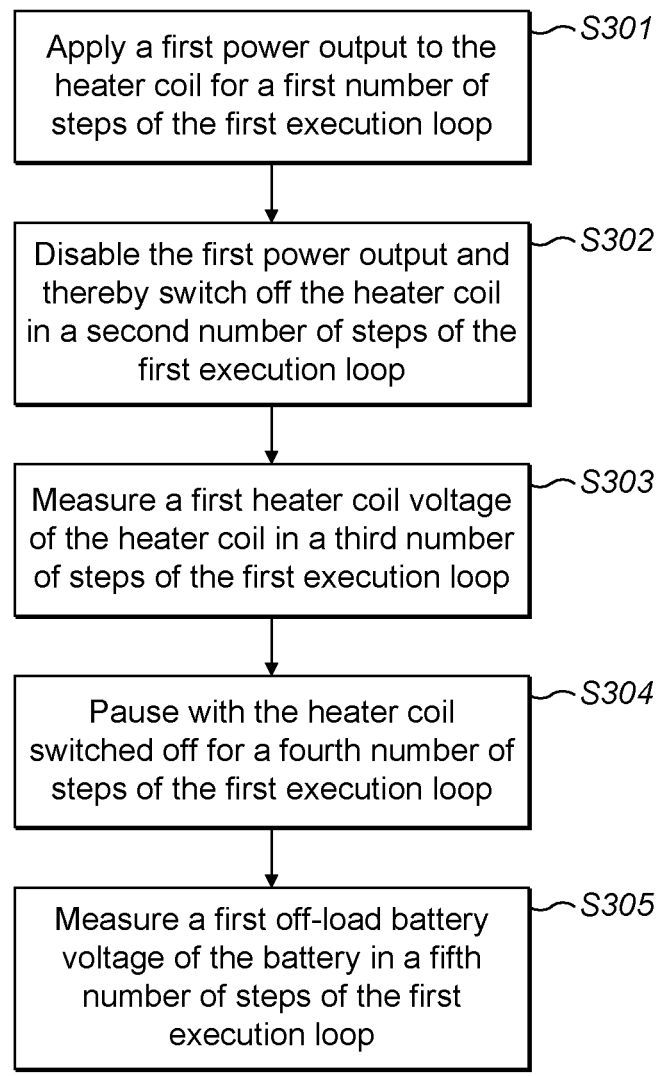
FIG. 3 is a is a flow diagram of an aerosol generating device heater control method according to an embodiment of the invention.

FIG. 3 shows a flow diagram of a method of controlling the heater 106 using the control device 104 described with reference to FIG. 2.

The main control unit 108 applies the PWM power output with a duty cycle to the heater coil and measures parameters relating to the heater coil in a series of execution loops. In a separate calculation loop, which runs in parallel to the execution loops, the main control unit calculates an updated power output with an updated duty cycle based upon the measured parameters. In an example, the calculation loop(s) use separate processing functionality to the execution loop(s) so as to not interfere with the execution loop(s).

In a first execution loop, at S301, the main control unit 108 applies a first power output to the heater coil for a first number of steps of the first execution loop. The first power output corresponds to a first PWM power output having a first duty cycle. Each step corresponds to a predetermined time interval, for example 66.6 μs (or a step frequency of 15 KHz). In an example, the first PWM power output is applied for 100 steps.

Each step can correspond to an integer number of PWM cycles, with a PWM cycle having an on period and an off period forming the PWM cycle. In an example, each step corresponds to one PWM cycle.

At S302, the main control unit 108 disables the first power output, thereby switching off the heater coil, in a second number of steps of the first execution loop. In an example, the second number of steps is one step.

In the second number of steps, the main control unit further sets the heater coil to a high voltage and measures an on-load battery voltage before switching off the heater coil.

The heater coil is set to the high voltage only for a short time, in the order of microseconds. This ensures that the battery has an on-load when measuring the on-load battery voltage.

At S303, the main control unit 108 measures a first heater coil voltage in a third number of steps. In an example, the third number of steps is one step.

The first heater coil voltage is measured using the heater coil sub-circuit 232. The heater coil sub-circuit 232 is switched on by the third capacitor 216 becoming discharged by the logic low signals of the PWM input to the MOSFET 206. A very low current is then passed through the test resistor 220 from the third battery terminal 202C to the heater coil positive terminal 222A. This allows for a small, controlled potential to be applied to the heater coil 106 when the heater coil 106 is switched off (i.e. when not being heated). This small, controlled potential allows for the heater voltage to be measured while the battery 102 recovers following heating the heater coil 106. In an example, the power supplied to the heater coil 106 during the measurement of the heater coil voltage is extremely low compared to the power applied to the heater coil during the first number of steps of the execution loop when the heater coil 106 is being heated.

At S304, the main control unit pauses the first execution loop, or takes no action in the first control loop, with the heater coil switched off for a fourth number of steps. In an example, the fourth number of steps is five steps.

The pause, at S304, between measuring the heater coil voltage at S303 and the off-load battery voltage measurement at S305 allows for the off-load battery voltage to be measured separately from the heater coil voltage so that the heater coil voltage is measured immediately after heating whilst allowing the battery time to recover, without the heating load applied (i.e. in an "off-load" state), before measuring the off-load battery voltage. This allows for both the heater coil voltage and off-load battery voltage to be measured as accurately as possible.

At S305, the main control unit measures a first off-load battery voltage in a fifth number of steps of the first execution loop. In an example, the fifth number of steps is one step.

In general, if a new PWM output, that is a PWM output with a new duty cycle, is available from the separate calculation loop, as will be described subsequently, the main control unit 108 updates the power output, in the fifth number of steps, for the next or subsequent loop. The main control unit 108 then initiates the subsequent execution loop, following substantially the same steps as the first execution loop, but using the updated power output. If a new PWM output is not available from the separate calculation loop, the main control unit 108 does not update the power output for the next loop. The main control unit 108 then initiates a second execution loop, following substantially the same steps as the first execution loop, using the first power output.

An example of the operation of each of the steps of the first execution loop is presented in Table 1.

TABLE 1

| Step Number | Operation |
| --- | --- |
| 0-99 | Apply a first power output to the heater coil |
| 100 | Disable the first power output and thereby switch off the heater coil, and |

TABLE 1-continued

| Step Number | Operation |
| --- | --- |
|  | optionally set the heater coil to a high voltage and measure a first on-load battery voltage before switching off the heater coil |
| 101 | Measure a first heater coil voltage of the heater coil |
| 102-105 | Pause with the heater coil switched off |
| 106 | Measure a first off-load battery voltage of the battery |

At the example of 66.6 µs per step, with 107 steps, the execution loop takes 7.13 ms to carry out the 107 steps.

The skilled person will readily understand that other numbers of steps, and the other time intervals per step, may be readily used in place of the aforementioned examples where appropriate.

In parallel to running the execution loops, the main control unit periodically triggers a calculation loop. For example, the main control unit triggers the calculation loop by checking for new, or updated, measurement data every 2 ms. If new measurement data is available from the execution loop(s) the calculation loop performs a calculation of an updated power output (i.e. a PWM power output with an updated duty cycle). If no new measurement data is available from the execution loop(s) no calculation is performed.

The calculation loop runs separately from the execution loops as the calculations can be more time-consuming than a single execution loop and may therefore cause delays to the heating if calculated as part of the execution loops.

The following description sets out how the calculation loop calculates the updated duty cycle using the parameters measured in the execution loop.

The calculation loop calculates the updated duty cycle, $D_{CYCLE}$, as follows:

$$D_{CYCLE} = \frac{I_{TARGET} \times \text{ENABLE\_PWM\_MATCH}}{I_{LOAD}}$$

$I_{TARGET}$ is the target current (in milliamps) to be applied to the heater coil, $I_{LOAD}$ is the maximum available load current (in milliamps) calculated from the on-load battery voltage and the heater coil resistance, capped by the current limit of the battery. This calculation gives the number of microprocessor counter cycles for which the output should be switched on per PWM cycle. ENABLE_PWM_MATCH is the internal counter value in the microprocessor corresponding to a single PWM cycle period (for example of 66.6 microseconds). In an example, the microprocessor counter runs at 16 MHz, for which ENABLE_PWM_MATCH is equal to 16 MHz×66.6 microseconds=1066.

In an example, the load current, $I_{LOAD}$, is calculated as:

$$I_{LOAD} = \frac{V_{ONLOAD}}{(R_{COIL} + R_{SERIES})}$$

$V_{ONLOAD}$ is the on-load battery voltage as measured in the second number of steps of the execution loop when setting the heater coil to a high voltage. The on-load battery voltage corresponds to the battery voltage in an on-load state, that is, a state at which the heating load is being applied. When a potential divider formed of two resistances $R_A$ and $R_B$ is used to scale the battery voltage to a suitable level for the microcontroller analogue to digital converter, with the voltage read by the analogue to digital converter being $V_{ADC}$, this can be expressed as:

$$V_{ONLOAD} = \frac{V_{ADC} \times (R_A + R_B)}{R_A}$$

In an example, resistance $R_A$ can be 1.5 k$\Omega$ and $R_B$ can be 2 k$\Omega$.

To establish ($R_{COIL}$ $R_{SERIES}$), the coil voltage ($V_{COIL}$) across COIL+ 222A and COIL– 222B is measured. ($R_{COIL}$+ $R_{SERIES}$) is the resistance of the heater coil as measured across COIL+ 222A and COIL– 222B, including the series resistance of the contacts, which are in series with the heater coil but which contribute to the measured voltage $V_{COIL}$, as stored in the electronics of the vapour generating material capsule. The series resistance is not expected to vary significantly with temperature, is measured at manufacture and stored in the capsule electronic circuit. In an example, ($R_{COIL}$ $R_{SERIES}$) is calculated as:

$$(R_{COIL} + R_{SERIES}) = \frac{V_{COIL} \times R_{TEST}}{V_{OFFLOAD} - V_{COIL}}$$

$R_{TEST}$ is the combination of the test resistance 220 contained in the heater coil measurement sub-circuit 232, and of other series resistances in the circuit (such as transistor series resistance, PCB tracks, connector resistance etc.), and is selected to give a suitable pin voltage considering the range of $R_B$ that will be encountered, the amplifier gain (not shown in FIG. 2) and the ADC range of the microcontroller 108. In an example, the test resistor 220 is 34$\Omega$.

$V_{OFFLOAD}$ is the off-load battery voltage as measured in the fifth number of steps of the execution loop. The off-load battery voltage corresponds to the battery voltage in an off-load state, that is, a state at which the heating load is not being applied. This is measured using the same potential divider as $V_{ONLOAD}$, but in the off-load state.

$V_{COIL}$ is the heater coil voltage measured in the third number of steps by the heater coil measurement sub-circuit 232. An amplifier circuit (not shown in FIG. 2) applies a gain and offset to this voltage before it is measured by the microcontroller ADC. In an example, the heater coil voltage can be measured as a function of the voltage at the pin of the microcontroller ($V_{PIN}$) as:

$V_{PIN} = V_{COIL} \times M + C$ such that:

$$V_{COIL} = \frac{V_{PIN} - C}{M}$$

wherein M is the amplifier gain, calculated as:

$$M = \frac{AMP\_CAL\_M}{AMP\_CAL\_M\_SCALE\_FACTOR}$$

and C, a corrective offset value, is calculated as:

$$C = \frac{AMP\_CAL\_C}{AMP\_CAL\_C\_SCALE\_FACTOR}$$

AMP_CAL_M is a value measured during device calibration for the gain of the amplifier circuit (not shown in FIG. 2). AMP_CAL_M_SCALE_FACTOR is used to facilitate arithmetic with integers instead of floating point numbers. In an example AMP_CAL_M_SCALE_FACTOR may have a constant value of 1000. AMP_CAL_C is a value measured during device calibration for the gain of the amplifier circuit (not shown in FIG. 2). AMP_CAL_C_SCALE_FACTOR is used to facilitate arithmetic with integers instead of floating point numbers. In an example, AMP_CAL_C_SCALE_FACTOR may have a constant value of 1000000.

The target current to be applied to the heater coil, $I_{TARGET}$, is calculated as:

$I_{TARGET} = (P_{GAIN} \times T_{ERROR}) + I_{GAIN} \times I_{SUM})$ $I_{TARGET}$ is the calculated current to be targeted (capped by the maximum current allowable). $I_{GAIN}$ and $P_{GAIN}$ are constants. $I_{GAIN}$ is a scaling factor used for the integral part of the PID (Proportional, Integral, Derivative) control system. P GAIN is the proportional gain for the controller executing the measurements. In an example, $I_{GAIN}$ has a value of 2500 and P GAIN has a value of 250. $I_{SUM}$ corresponds an integral summation term used in the PID calculation. The PI control algorithm is used to calculate the required current to reduce the temperature error, based on the measurements taken of the coil resistance and battery voltage. The algorithm executes as part of the calculation loop and does not trigger measurements directly; the measurements are triggered separately in the execution loop.

$T_{ERROR}$ is the difference between the target temperature of the heater coil, $T_{TARGET}$, and the measured coil temperature $T_{COIL}$, such that:

$T_{ERROR} = T_{TARGET} - T_{COIL}$

The temperature of the coil, $T_{COIL}$, is determined based upon the resistance of the heater coil, $R_{COIL}$, as measured from the heater coil measurement sub-circuit 232, in that:

$$T_{COIL} = \left(\frac{R_{COIL}}{R_{REFCOIL}} - 1\right) \times \frac{1}{\alpha} + T_{REF}$$

$R_{REFCOIL}$ is a reference value of the coil resistance stored in the electronics of the vapour generating material capsule.

The constant $\alpha$ is a coefficient of resistance, a property of the wire used for the coil. In an example, $\alpha$ may have a value of 0.004130.

$T_{REF}$ is a reference temperature stored as a constant in the microprocessor code corresponding to $R_{REFCOIL}$. In an example $T_{REF}$ is set to 25° C.

If the target current is calculated as being higher than the maximum available current allowed to be taken from the battery, then the effective temperature error, which would have resulted in the maximum available current being calculated, is used to increase the $I_{SUM}$ value. Otherwise, the actual temperature error is used as:

$$I_{SUM} = \frac{T_{ERROR}}{TEMP\_ERROR\_DIVIDER}$$

TEMP_ERROR_DIVIDER is the sensitivity of $I_{GAIN}$ to the temperature error. In an example TEMP_ERROR_DIVIDER has a value of 600.

Figure 4:
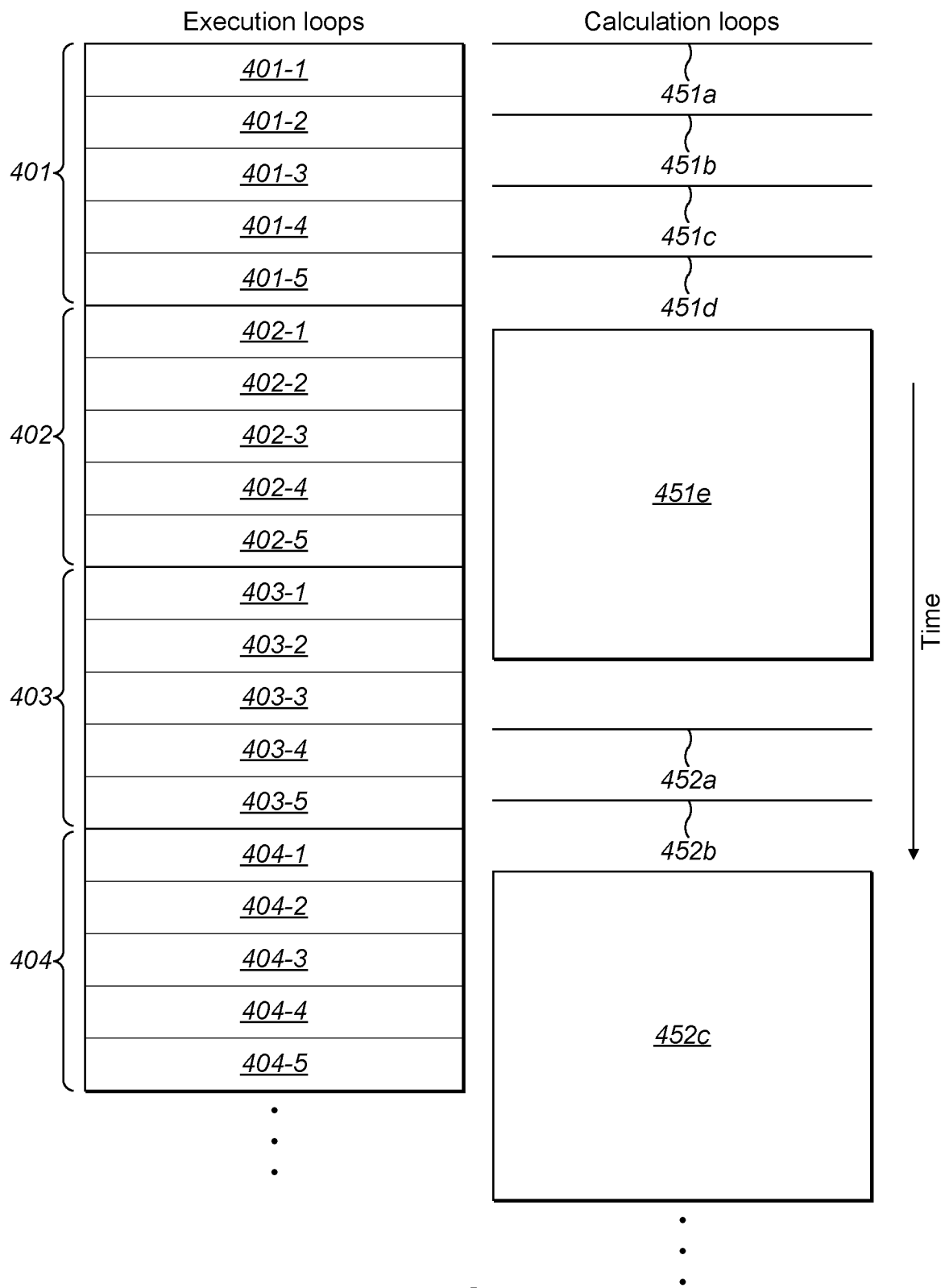
FIG. 4 is a conceptual timeline diagram of the heater controller method according to an embodiment of the invention.
Figure 5:
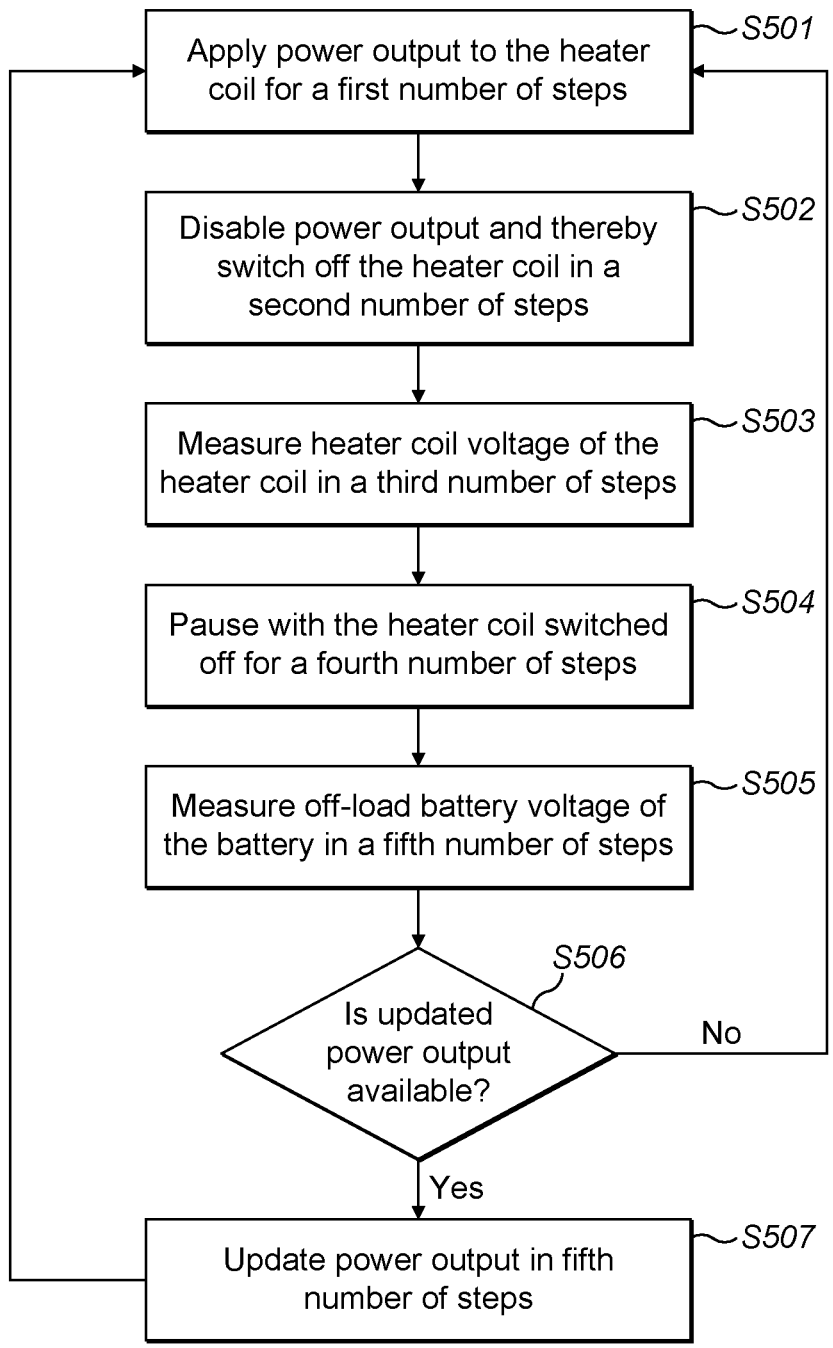
FIG. 5 is a flow diagram of processes involved in an execution loop.
Figure 6:
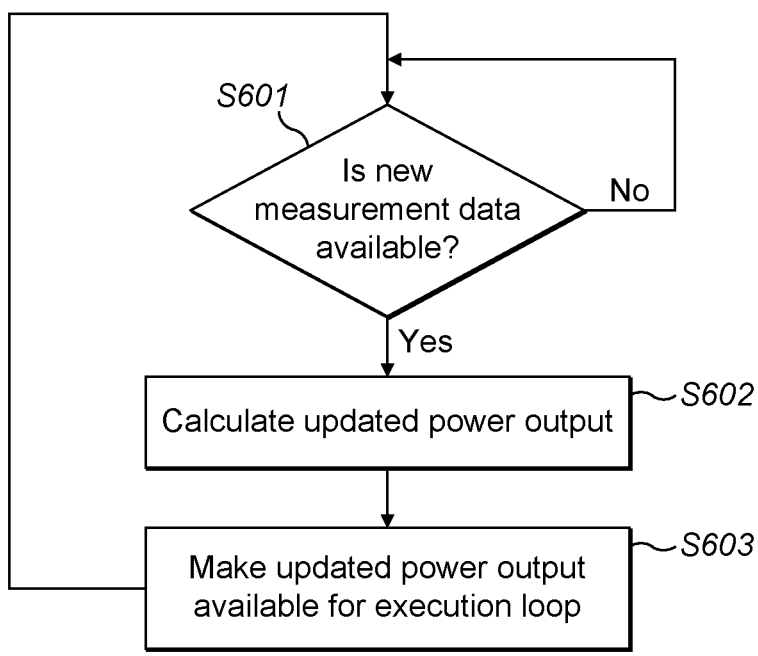
FIG. 6 is a flow diagram of processes involved in a calculation loop.

FIG. 4 presents a timeline of how the execution loops and calculation loops are carried out with respect to one another according to an example. FIGS. 5 and 6 respectively present flow diagrams of the processes involved in the execution and calculation loops.

The first execution loop 401 is carried out as described with reference to FIG. 2. At S501 in the first execution loop 401 the main control unit applies the first power output to the heater coil for the first number of steps 401-1. At S502 in the first execution loop 401 the main control unit sets the heater coil to a high voltage and measures a first on-load battery voltage before switching off the heater coil disabling the first power output for the second number of steps 401-2. Setting the heater to the high voltage relates to setting the input line from the main control unit (or microprocessor unit) 108 to turn on the main MOSFET 206, rather than any specific temperature target. This happens for a very short period of time (on the order of microseconds) and therefore has negligible heating effect. At S503 in the first execution loop 401 the main control unit measures a first heater coil voltage of the heater coil in a third number of steps 401-3. At S504 in the first execution loop 401 the main control unit pauses with the heater coil switched off for the fourth number of steps 401-4. At S505 in the first execution loop 401 the main control unit measures a first off-load battery voltage of the battery in a fifth number of steps 401-5. It is noted that, in FIG. 4, the numbers of steps within each execution loop are not shown to scale, but are instead equally spaced for ease of conceptualisation.

At the same time as the first execution loop is carried out, the main control unit performs periodic monitoring steps 451a, 451b, 451c, 451d for new measurement data for the calculation loop. As depicted in FIG. 6, the calculation loop checks if new measurement data is available at S601, if it is available the calculation loop proceeds to S602 and calculates the updated power output. At S603 the main control unit makes the updated power output available for the execution loop. In an example the updated power output is calculated as previously described. If new measurement data is not available, the process loops back to S601 and checks again if new measurement data is available from the execution loop. This process repeats until new measurement data is available and the process can proceed to S602. In an example, the process loops to S601 to check for new measurement data every 2 ms. Such an interval has been found to be advantageous because the main control unit is also servicing other tasks, such as a Bluetooth connection. For example, if the interval in which new measurement data is checked for was considerably longer, and these other tasks were to delay the calculation loop and it missed its timeslot, it would be a considerable time period until the new measured values would be available; this could cause considerable jitter and inconsistency in the timing of processing data. Running the second loop every 2 ms, for example, ensures a maximum of 2 ms of latency or jitter. This has been found to be an acceptable time period, without adding unduly to the loading of the main control unit or microprocessor.

Returning to the first execution loop, in the fifth number of steps 401-5 of the first execution loop 401, at S506, the main control unit checks whether an updated power output is available from the calculation loop. If an updated power output is available, the process proceeds to S507 and the power output is updated for the next execution in the fifth number of steps. However, during the first execution loop 401 no measurement data has been made available to the calculation loop as the measurements are still being made. As such no calculations have yet been performed. As a consequence, the main control unit does not update the power output in the fifth number of steps 401-5 of the first execution loop 401 for the next execution loop. Instead, the first power output is used for the second execution loop 402 and the process returns to S501 for the second execution loop 402. That is, following the first execution loop 401, the second execution loop 402 is carried out using the first power output.

At S501 in the second execution loop 402 the main control unit applies the first power output to the heater coil for the first number of steps 402-1. At S502 in the second execution loop 402 the main control unit sets the heater coil to a high voltage and measures a second on-load battery voltage before switching off the heater coil disabling the first power output for the second number of steps 402-2. At S503 in the second execution loop 402 the main control unit measures a second heater coil voltage of the heater coil in a third number of steps 402-3. At S504 in the second execution loop 402 the main control unit pauses with the heater coil switched off for the fourth number of steps 402-4. At S505 in the second execution loop 402 the main control unit measures a second off-load battery voltage of the battery in a fifth number of steps 402-5.

Whilst the second execution loop is being carried out, the main control unit determines at S601 that new measurement data is available for the calculation loop in monitoring step 451e, that is the first monitoring step that occurs after the completion of the first execution loop. The process of FIG. 6 then proceeds to S602 and the main control unit executes a first calculation loop 451e, using the measurement data.

In the example of FIG. 4, the first calculation loop takes substantially longer than each execution loop. As such, at the end of the second execution loop 402 the first calculation loop 451e is still being carried out and no updated power output is ready. That is, when the second execution loop 402 reaches S506 at in fifth number of steps 402-5 of the second execution loop no updated power output is available from the calculation loop and so the process returns to S501 for the third execution loop 403. As no updated power output is ready at the end of the second loop 402, the main control unit carries out a third execution loop 403, using the first power output, following the second execution loop 402.

At S501 in the third execution loop 403 the main control unit applies the first power output to the heater coil for the first number of steps 403-1. At S502 in the third execution loop 403 the main control unit sets the heater coil to a high voltage and measures a third on-load battery voltage before switching off the heater coil disabling the first power output for the second number of steps 403-2. At S503 in the third execution loop 403 the main control unit measures a third heater coil voltage of the heater coil in a third number of steps 403-3. At S504 in the third execution loop 403 the main control unit pauses with the heater coil switched off for the fourth number of steps 403-4. At S505 in the third execution loop 403 the main control unit measures a third off-load battery voltage of the battery in a fifth number of steps 403-5.

When the third execution loop 403 reaches the fifth number of steps 403-5, the main control unit 108 determines at S506 that the calculation loop 451e has been completed and that an updated power output has been output from the calculation loop at S603. As such, the execution loop process proceeds to S506 and the main control unit 108 updates the first power output to the updated power output at the fifth number of steps 403-5 of the third execution loop 403.

The execution loop process then loops back to S501 for a subsequent (or fourth) execution loop. At S501 the main control unit 108 carries out the fourth execution loop 404 using the updated power output for a first number of steps of the fourth execution loop 404-1. At S502 in the fourth execution loop 404, the main control unit 108 then sets the heater coil to a high voltage and measures a fourth on-load battery voltage before switching off the heater coil disabling the updated power output for the second number of steps 404-2. At S503 in the fourth execution loop 404 the main control unit measures a fourth heater coil voltage of the heater coil in a third number of steps 404-3. At S504 in the fourth execution loop 404 the main control unit pauses with the heater coil switched off for the fourth number of steps 404-4. At S505 in the fourth execution loop 404 the main control unit measures a fourth off-load battery voltage of the battery in a fifth number of steps 404-5.

Following the completion of the first calculation loop, at S603 the calculation loop process loops back to S601 and checks again if new measurement data is available from the execution loop. This process repeats until new measurement data is available and the process can proceed to S602.

If no updated measurement data is yet available, for example due to the fourth execution loop 404 using the updated power output not yet having been completed, the main control unit 108 performs periodic monitoring steps 452a, 452b at S601 for the new measurement data. The main control unit 108 determines that new measurement data is available for the calculation loop in monitoring step 452c, that is the first monitoring step that occurs after the completion of the fourth execution loop 404. The calculation loop process then proceeds to S602 for a second calculation loop 452c and the main control unit 108 carries the second calculation loop 452c, using the new measurement data.

The process then repeats in this manner, updating the power output when an updated power output is available, and calculating an updated power output when new measurement data is available.

The skilled person will readily understand that the first calculation loop may take a shorter or longer time than in the preceding example and that the first calculation loop may be completed during the second execution loop such that the power output is updated in the second execution loop for the third execution loop, or that the calculation loop may be completed during the third or later execution loop such that the power output is updated in the fourth or later execution loop. The same applies with regard to when the calculation loops are carried out with respect to the length and number of execution loops, as appropriate.

The processing steps described herein carried out by the main control unit may be stored in a non-transitory computer-readable medium, or storage, associated with the main control unit. A computer-readable medium can include non-volatile media and volatile media. Volatile media can include semiconductor memories and dynamic memories, amongst others. Non-volatile media can include optical disks and magnetic disks, amongst others.

It will be readily understood to the skilled person that the preceding embodiments in the foregoing description are not limiting; features of each embodiment may be incorporated into the other embodiments as appropriate.

The invention claimed is:

1. A control device of an aerosol generating device, the control device comprising a main control unit, and connectable to a battery and a heater coil, the main control unit configured to carry out one or more execution loops, a first execution loop of the one or more execution loops comprising:
    applying a first power output to the heater coil for a first number of steps of the first execution loop;
    disabling the first power output and thereby switching off the heater coil in a second number of steps, following the first number of steps, of the first execution loop;
    measuring a first heater coil voltage of the heater coil in a third number of steps, following the second number of steps, of the first execution loop with a smaller power output than the first power output applied to the heater coil;
    pausing with the heater coil switched off for a fourth number of steps, following the third number of steps, of the first execution loop; and
    measuring a first off-load battery voltage of the battery in a fifth number of steps, following the fourth number of steps, of the first execution loop, wherein the first off-load battery voltage corresponds to the battery being in an off-load state in which a heating load is not being applied;
    wherein each step in the first number of steps, the second number of steps, the third number of steps, the fourth number of steps, and the fifth number of steps corresponds to a predetermined time period; and
    wherein the main control unit is further configured to calculate an updated power output based upon the first heater coil voltage and the first off-load battery voltage.

2. The control device of claim 1, wherein the main control unit is further configured to apply the updated power output to the heater coil in a subsequent execution loop that is subsequent to the first execution loop.

3. The control device of claim 2, wherein the main control unit is further configured to calculate the updated power output based upon the first heater coil voltage and the first off-load battery voltage in a calculation loop separate from the one or more execution loops.

4. The control device of claim 3, wherein the main control unit is configured to carry out the calculation loop and the one or more execution loops using separate processing functionalities.

5. The control device of claim 3, wherein the main control unit is further configured to carry out a second execution loop, wherein the first execution loop is offset from the subsequent execution loop by at least the second execution loop and wherein the second execution loop comprises:
    applying the first power output to the heater coil for a first number of steps of the second execution loop;
    and wherein the main control unit carries out the calculation loop at least partially in parallel to the second execution loop.

6. The control device of claim 3, wherein the main control unit is further configured to carry out a third execution loop between the first execution loop and the subsequent execution loop, wherein the third execution loop comprises:
    applying the first power output to the heater coil for a first number of steps of the third execution loop; and
    updating the first power output to the updated power output in response to determining that the updated power output is available from the calculation loop.

7. The control device of claim 1, wherein each of the first power output and the updated power output is a pulse width modulated output with an associated duty cycle.

8. The control device of claim 1, wherein the main control unit is configured to calculate a temperature of the heater coil based upon a resistance of the heater coil, and further configured to calculate the updated power output based on a difference between the calculated heater coil temperature and a target heater coil temperature.

9. The control device of claim 8, further comprising a heater coil measurement sub-circuit, the heater coil measurement sub-circuit comprising a battery terminal connected to the heater coil and a test resistor arranged therebetween.

10. The control device of claim 9, wherein the heater coil measurement sub-circuit is arranged to apply a smaller power than the first power output to the heater coil to measure the first heater coil voltage.

11. The control device of claim 10, wherein the main control unit is configured to calculate the resistance of the heater coil based on the first heater coil voltage, a resistance of the test resistor, and the first off-load battery voltage.

12. The control device of claim 1, wherein the main control unit is further configured to, in the second number of steps, set the heater coil to a high voltage and measure a first on-load battery voltage before switching off the heater coil.

13. The control device of claim 1, further comprising a first transistor, wherein a pulse width modulation input switches the first transistor to apply a pulse width modulation output to the heater coil.

14. An aerosol generating device comprising the control device of claim 1.

15. A method of operating a control device of an aerosol generating device, the method comprising:
  in a first execution loop:
    applying a first power output to a heater coil for a first number of steps of the first execution loop;
    disabling the first power output and thereby switching off the heater coil in a second number of steps, following the first number of steps, of the first execution loop;
    measuring a first heater coil voltage of the heater coil in a third number of steps, following the second number of steps, of the first execution loop with a smaller power output than the first power output applied to the heater coil;
    pausing with the heater coil switched off for a fourth number of steps, following the third number of steps, of the first execution loop; and
    measuring a first off-load battery voltage of a battery in a fifth number of steps, following the fourth number of steps, of the first execution loop, wherein the first off-load battery voltage corresponds to the battery being in an off-load state in which a heating load is not being applied;
  wherein each step in the first number of steps, the second number of steps, the third number of steps, the fourth number of steps, and the fifth number of steps corresponds to a predetermined time period; and
  the method further comprising calculating an updated power output based upon the first heater coil voltage and the first off-load battery voltage.

16. A non-transitory computer-readable medium storing instructions that, when executed by one or more processors, cause the one or more processors to carry out:
  in a first execution loop:
    applying a first power output to a heater coil for a first number of steps of the first execution loop;
    disabling the first power output and thereby switching off the heater coil in a second number of steps, following the first number of steps, of the first execution loop;
    measuring a first heater coil voltage of the heater coil in a third number of steps, following the second number of steps, of the first execution loop with a smaller power output than the first power output applied to the heater coil;
    pausing with the heater coil switched off for a fourth number of steps, following the third number of steps, of the first execution loop; and
    measuring a first off-load battery voltage of a battery in a fifth number of steps, following the fourth number of steps, of the first execution loop, wherein the first off-load battery voltage corresponds to the battery being in an off-load state in which a heating load is not being applied;
  wherein each step in the first number of steps, the second number of steps, the third number of steps, the fourth number of steps, and the fifth number of steps corresponds to a predetermined time period; and
  further comprising calculating an updated power output based upon the first heater coil voltage and the first off-load battery voltage.

* * * * *